INVENTORS: J. E. IWERSEN
B. T. MURPHY
J. H. WUORINEN, JR.
BY Arthur J. Torsiglieri
ATTORNEY United States Patent Office 3,541,531
Patented Nov. 17, 1970

3,541,531

SEMICONDUCTIVE MEMORY ARRAY WHEREIN OPERATING POWER IS SUPPLIED VIA INFORMATION PATHS

John E. Iwersen, Bernardsville, Bernard T. Murphy, New Providence, and John H. Wuorinen, Jr., Westfield, N.J., assignors to Bell Telephone Laboratories, Incorporated, Murray Hill and Berkeley Heights, N.J., a corporation of New York Filed Feb. 7, 1967, Ser. No. 614,489
Int. Cl. G11c *11/40;* H03k *3/286*
U.S. Cl. 340—173 6 Claims

ABSTRACT OF THE DISCLOSURE

A semiconductive memory system is organized to permit the word and digit lines to serve for both writing and reading and to provide the operating power. Word lines in rows and pairs of digit lines in columns are interconnected by semiconductive flip-flops which serve as storage cells. The storage cells are formed as an array in a monolithic semiconductive body.

This invention relates to semiconductive memory systems.

Hitherto, the principal emphasis has been on magnetic memory systems, but there is growing interest in semiconductive memory systems, and a number of such systems have been proposed hitherto. A problem characteristic of such prior art semiconductive system is that the individual memory cell typically has been relatively complex. The present invention, on the other hand, involves individual memory cells which are reltatively simple and which have the particular advantage that the basic cell can be operated with a total of three terminal connections.

The invention will be described particularly with reference to a word-organized memory for which the invention has primary application. However, by appropriate changes to the individual cells, particularly to include an "and" function, the principles of the invention can be extended to a bit-organized memory. To this end, in the word-organized form, the organization of the memory is such that the word line and the pair of digit lines, which are connected ot the three terminal connections, in addition to use in the writing and reading processes also serve to provide the operating power. Additionally, the presence or absence of a digit pulse in a digit line is detected during readout as a change in the current normally flowing through such line. This simplicity makes particularly convenient both the integration of the basic cell in monolithic form and also the integration of an array of cells in monolithic form.

Specifically, for such a memory the basic cells each comprise a flip-flop made up of a pair of transistors (either of the junction or field-effect types), and information is stored in individual cells by setting the flip-flop to a state appropriate to the digit to be stored therein. Nondestructive readout is achieved by increasing the current in a selected word line and detecting changes in current in the appropriate digit line. Destructive readout is achieved by decreasing the current in a selected word line sufficiently to turn the flip-flop off and detecting the decrease in current in the appropriate digit line.

In the presently preferred embodiment the basic cell comprises a flip-flop made up of a pair of junction transistors, the base of each being connected directly to the collector of the other, the collectors being interconnected by a feedback resistance and being connected to a word-line terminal by separate load resistances, and the emitter of each is connected to separate ones of two digit lines. Accordingly, each basic cell includes only three terminals, one of which is connected to a word line and two of which are connected to a pair of digit lines. Moreover, advantageously, the entire flip-flop is constructed in a monolithic integrated circuit.

The invention will be better understood from the following more detailed description taken in conjunction with the accompanying drawing, in which.

Figure 1:
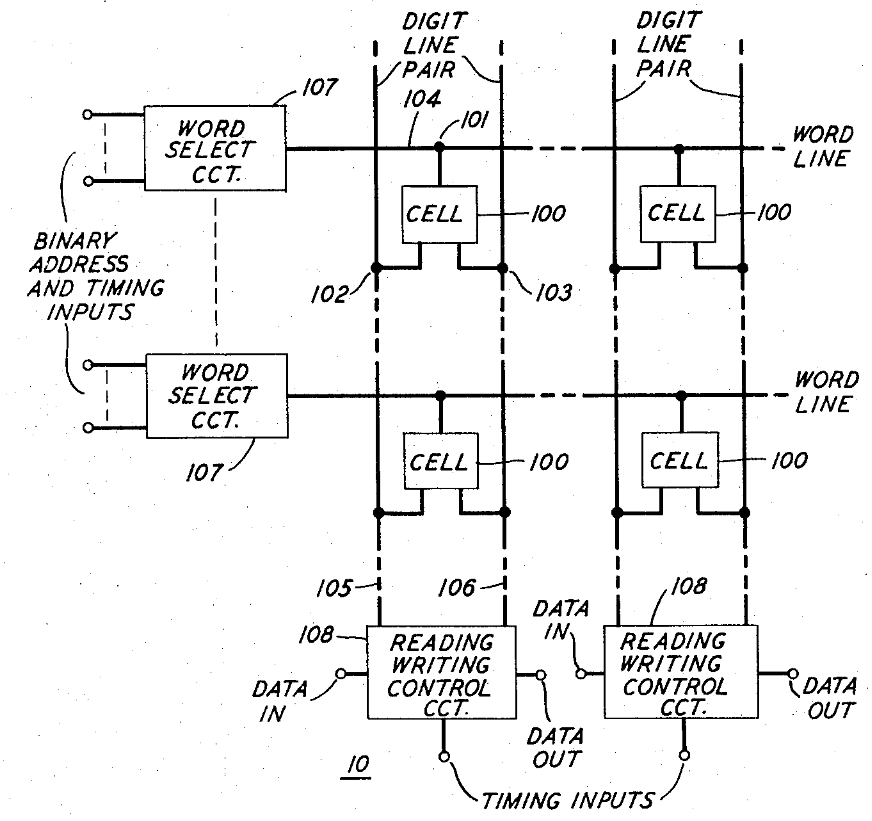
FIG. 1 shows in block circuit form a word-organized memory in accordance with the preferred form of the invention.

With reference now to the drawing, in FIG. 1 are shown the basic elements of the word-organized memory 10. A plurality of individual storage cells 100 are arranged in a two-dimensional array of rows and columns in conventional fashion. Each cell in essence is a flip-flop having two stable states between which it can be switched for the storage of binary digits. As seen, each cell is provided with three terminals, one of which is connected to an associated word line and two are connected to separate lines of an associated digit line pair. For example, one selected cell is shown having terminals 101, 102 and 103 connected to word line 104 and digit lines 105 and 106, respectively. Each word line is driven by a word select circuit 107, to which is supplied binary address and timing inputs in the usual fashion. Each pair of digit lines in turn is connected to its own reading and writing control circuit 108, to which are applied storage data and timing inputs and from which are derived the stored data in conventional fashion.

Write-in of a word to a particular word line is achieved by reducing the voltage on the word line involved by addressing the corresponding word-select circuit appropriately to turn off all the flip-flops connected to the corresponding word line and subsequently reapplying the holding word-line voltage while applying a small information signal across each digit-line pair by way of the reading and writing control circuit. Upon restoration of the word-line voltage, the state of each flip-flop will be determined by which of the two digit lines associated therewith has the higher potential, a factor which will be determined by the sign of the potential difference temporarily established between the two digit lines coincidentally with the restoration of word-line voltage by the signal information to be stored. This potential difference is made sufficiently small that it does not affect the flip-flops connected to word lines whose voltage has remained constant.

For nondestructive readout of the stored information, the voltage on the word line to be read is increased temporarily above its normal holding value by addressing the appropriate word line. This increase in word-line voltage is made to increase the current flowing in the digit line associated with the conducting half of the flip-flop. This increase in current is detected by the corresponding reading circuit which translates such increase in current in one of the two-digit lines to a characteristic output signal. However, the increase in current flow in the digit line should be insufficient to affect deleteriously the information on the other cells in the same column.

Alternatively, if destructive readout is desired, the voltage on the word line to be read is reduced sufficiently to turn the flip-flop completely off, and the consequent decrease in the current in the digit-line associated with the half of the flip-flop which will have been turned off is detected, and an output signal characteristic of such line will be provided by the reading control circuit. In this case, the decrease in current flow in the digit line and the consequent voltage change is made insufficient to affect deleteriously the other cells in the same column.

Figure 2:
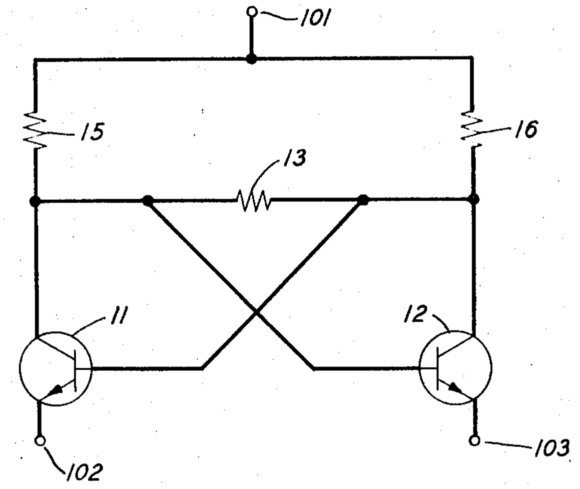
FIG. 2 shows a schematic diagram of a junction transistor form of memory cell for use in the invention.

In FIG. 2, there is shown a circuit schematic of a flip-flop especially suitable for use as the cell 100 in the memory shown in FIG. 1. It comprises a pair of matched junction transistors, shown here illustratively of the NPN type, connected to form a flip-flop. To this end, the base of transistor 11 is connected directly to the collector of transistor 12 and the base of transistor 12 is connected directly to the collector of transistor 11. A feedback resistor 13 is shown interconnecting the two collectors and the two collectors are connected to the word-line terminal 101 by matched load resistors 15 and 16, respectively. The emitter of transistor 11 is connected directly to the digit-line terminal 102, and the emitter of transistor 12 to digit-line terminal 103.

For writing, application of a small pulse to terminal 102 of a polarity to make its potential lower than that of terminal 103 at the time the word-line voltage to terminal 101 has been restored to its normal holding value after having been reduced enough to turn both transistors off, results in transistor 11 being turned on preferentially to transistor 12 and maintaining such state so long as the word-line voltage is maintained to at least its characteristic holding value. Conversely, application of a pulse to terminal 103 to decrease its potential vis-a-vis terminal 102 would have selectively activated transistor 12. In a manner characteristic of a flip-flop, when current has once commenced flowing in one of the two transistors, its collector voltage and consequently the base voltage of the other transistor is lowered, with the consequence that the other transistor does not reach the state in which it conducts appreciably. In the circuit described, feedback resistor 13 simply minimizes saturation and speeds removal of stored charge, whereby the recovery time after turnoff is reduced to permit faster cycling. Accordingly, it can be eliminated if this action is not desired.

For nondestructive readout, as previously explained, the word-line voltage on terminal 101 is increased, and such increase will result in an increase in the current passed by the conducting transistor and so in the associated digit line, and such increase is translated by the reading circuit into an appropriate output signal.

For destructive readout, the voltage on the word line is reduced sufficiently to cut off conduction by the conducting transistor, and the decrease in current in the digit line associated therewith is translated by the readout circuit into an appropriate output signal.

Figure 3A:
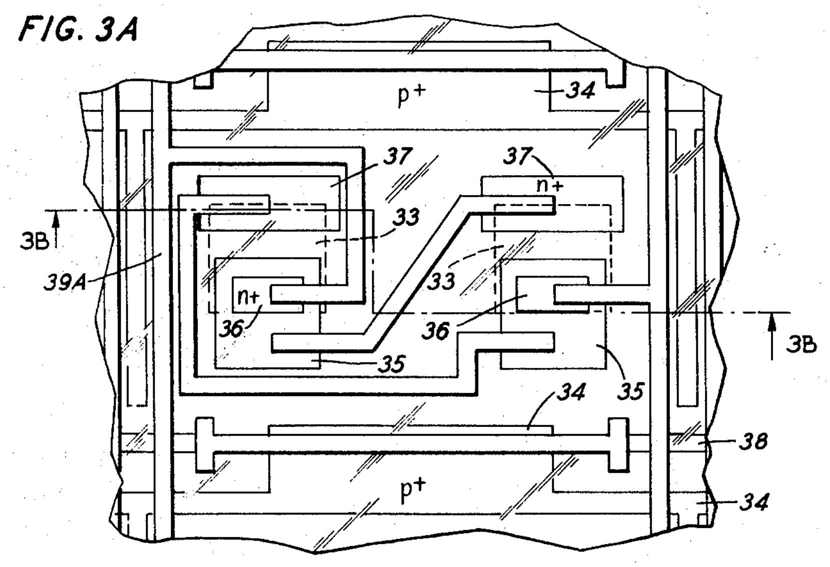
FIGS. 3A and 3B show plan and sectional views, respectively, of a portion of the integrated monolithic circuit comprising an array of memory cells of the kind shown in FIG. 2.
Figure 3B:
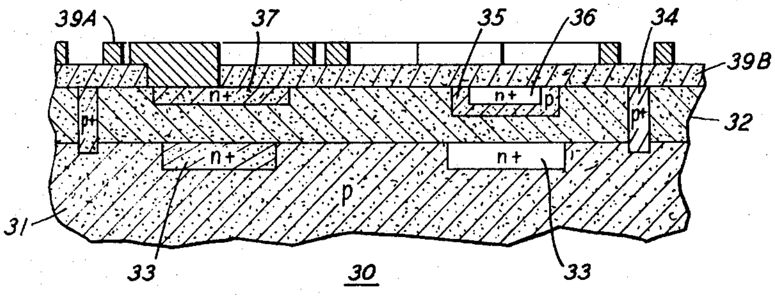

An important advantage of the memory which has been described is that the simplicity of the unit cell readily permits fabrication of at least the basic cell array in monolithic integrated circuit form. With reference now to FIGS. 3A and 3B, there is shown by way of example a portion of a monolithic integrated circuit showing a discrete cell.

In the manner known for the fabrication of monolithic integrated circuits, the array of cells is formed in a monocrystalline silicon slice 30. The cell comprises original substrate material 31 of p-type conductivity and a relatively thin epitaxial layer 32 of n-type grown thereover. However, before growth of the epitaxial layer, the p-type substrate is diffused selectively to form the localized $n^+$-type regions 33, which serve as the connections and the collector regions of the NPN transistors. After growth of the epitaxial layer, there is a localized deep diffusion to form the $p^+$ regions 34 which penetrate completely the epitaxial layer to the original substrate material to help isolate electrically from one another the discrete cells of the array. This is followed by a localized diffusion to form the p-type base zones 35 of the transistor. This is followed in turn by a localized diffusion to form simultaneously the $n^+$-type emitter zones 36, collector connection regions 37, and word-line connection regions 38. The feedback resistor 13 shown in FIG. 2 is provided by the sheet resistance separating the two localized $n^+$ regions 33. Additionally, each of the load resistors 15 and 16 is provided by the sheet resistance of the epitaxial n-type layer separating the collector connection region 37 and its associated word-line connection region 38. As seen in FIG. 3A, these are separated from one another a finite amount on the surface of the slice.

The desired interconnections are achieved by metallic layers 39A overlying an insulating layer 39B in known fashion. Advantageously, the leads may be composite layers of titanium, platinum and gold of the kind described in U.S. Pat. No. 3,426,252, issued Feb. 4, 1969, to M. P. Lepselter. The insulating layer, for example, may be of aluminum oxide, silicon oxide, silicon nitride or a composite of oxide and nitride. As shown, the word lines run horizontally across the slice, making electrical connection to the slice at the word-line connection regions 38. The digit lines run vertically as shown and make electrical connection to the slice by way of a lead extending from the emitter connection. The digit lines cross over the word lines, and to facilitate the crossover an $n^+$-type crossunder region is provided in the slice to serve as the word line in the crossover region, as for example described in U.S. Pat. 3,295,031.

Figure 4:
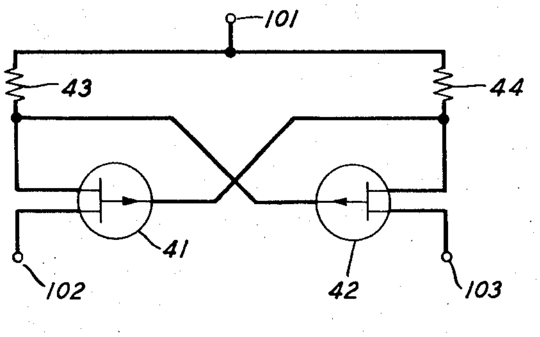
FIG. 4 shows a diagrammatic schematic of a field-effect transistor form of memory cell for use in the invention.

As has previously been indicated, the basic cell also may comprise a flip-flop made up of unipolar transistors. An illustrative flip-flop of this kind is shown in FIG. 4. In this circuit, transistors 41 and 42 are field-effect transistors advantageously of the insulated-gate type operating in the enhancement or normally off mode. As such, each is normally cut off in the absence of an appropriate voltage difference relative to the source on the gate electrode. Transistors 41 and 42 have their drains connected to word-line terminal 101 by way of load resistors 43 and 44, respectively. Additionally, the drain of transistor 41 is directly connected to the gate of transistor 42 and the drain of transistor 42 to the gate of transistor 41 in the manner characteristic of flip-flops. The sources of transistors 41 and 42 are connected to the digit-line terminals 102 and 103, respectively.

The operation essentially is the same as that of the flip-flop shown in FIG. 2. For writing, the word-line voltage on terminal 101 is dropped sufficiently to turn off both transistors and then restored to its normal holding value. The state of the flip-flop, i.e., which transistor will thereafter become conducting, can be controlled by the polarity of the writing signal pulse applied between terminals 102 and 103.

For nondestructive readout the word-line voltage at terminal 101 is raised and there is detected for translation into an appropriate output signal the resulting increase in current in the affected digit-line.

For destructive readout, the word-line voltage is dropped sufficiently to turn the flip-flop off and the decrease in current in the digit-line associated with the transistor being cut off is translated into an appropriate output pulse.

From the prior discussion relating to FIGS. 3A and 3B, it should be readily apparent to a worker in the art how to fabricate an array of flip-flops of this kind in monolithic integrated circuit form, and so in the interest of brevity the process for doing so will not be described specifically.

It should also be apparent by now that a variety of flip-flops can be used in the practice of the invention. It is also the case that the word select circuit and reading and writing control circuit can take a variety of forms. However, for purposes of illustration there will be described suitable exemplary forms of such circuits.

Figure 5:
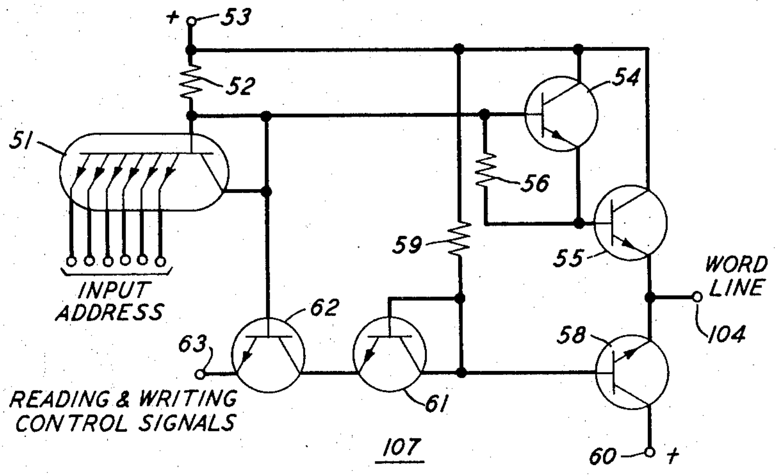
FIG. 5 shows a schematic diagram of a word-select circuit suitable for use in the memory of FIG. 1.

In FIG. 5 there is shown a circuit schematic of one form of word select circuit that has been used successfully in the memory described.

The circuit 107 includes an NPN junction transistor 51 which is provided with multiple emitters, one for each digit of the input address. For a 64-word system corresponding to a 6-bit binary address, six emitters are included in transistor 51. The base of transistor 51 is connected by way of resistor 52 to the positive terminal 53 of a D-C voltage source (not shown). The base of transistor 51 is also connected to the base of NPN transistor 54. The collector of transistor 51 is shorted to its base. The positive terminal 53 is also connected to the collectors of each of NPN transistors 54 and 55, and a resistor 56 is connected between the base of transistor 54 and its emeitter. The latter in turn is connected to the base of transistor 55 and the emitter of transistor 55 is connected to the word-line 104. Additionally, the circuit includes NPN transistor 58 whose emitter is connected to the word line 104, whose collector is connected to the positive terminal 60 of a D-C voltage supply (not shown) whose voltage is significantly lower than that on terminal 53. The base of transistor 58 is connected to terminal 53 by way of the voltage dropping resistor 59. The base of transistor 58 additionally is connected directly to both the base and the collector of NPN transistor 61 whose emitter is connected to the collector of NPN transistor 62 whose base is connected to the collector of transistor 51 and whose emitter is connected to terminal 63 to which are applied the reading and writing control signals.

In operation, the transistor 51 serves as an "and" gate, and in the absence of the appropriate addressing voltage to its input gates, it is conducting, with the result that there is a sizeable voltage drop across resistor 52, and the voltages on the base of each of transistors 54 and 55 are low, with the consequence that each is in a nonconducting state. Under these conditions, the voltage on the word line 104 remains fixed at a voltage essentially determined by the voltage at terminal 60 less the small drop through transistor 58, which is conducting.

However, when the appropriate addressing signals are applied to the "and" gate 51 and it is turned off, the voltage on the base of each of transistors 54 and 62 tends to be increased. Which of these transistors is made conducting depends on the state of terminal 63. If it is intended to read at that time, there will be applied a relatively large reading control pulse on terminal 63, with the consequence that transistor 62 will remain in a nonconducting state and transistor 54 conducts. When transistor 54 conducts, it forms with transistor 55 a so-called "Darlington" amplifier, and additional current is supplied to the word line 104 to increase the current flowing in the conducting transistors in its row of cells for translation into appropriate output voltages.

For writing, on the other hand, the voltage on terminal 63 is maintained only enough above ground to permit a safety margin on operation of the "and" gate 51. In this instance, transistor 62 will conduct when gate 51 is nonconducting, and such conduction holds transistor 54 in a nonconducting state and turns off previously conducting transistor 58 with a cutoff of power to the word line 104 and a consequent cutoff in power to all the individual cells supplied by such word line.

Figure 6:
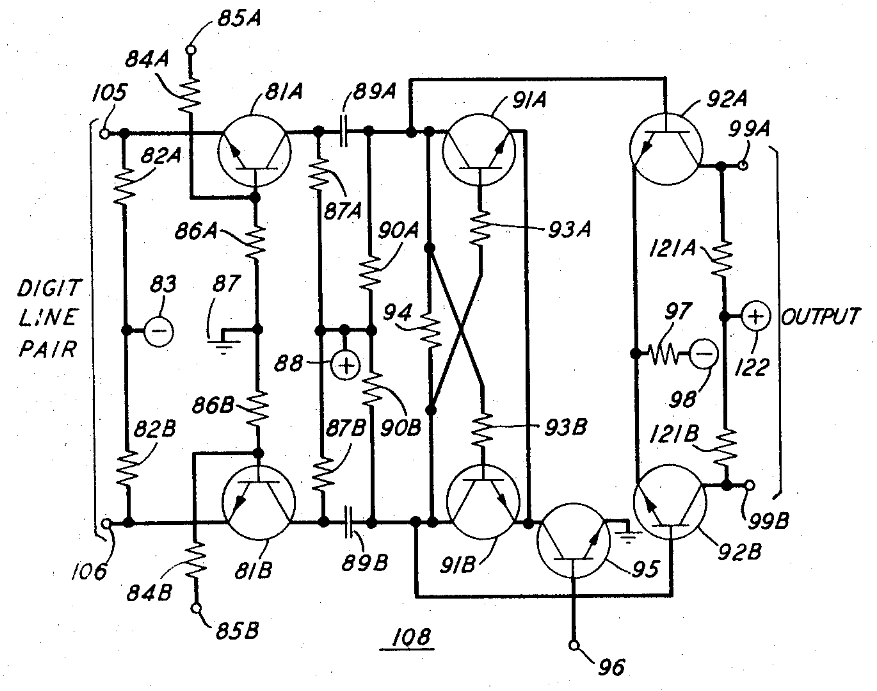
FIG. 6 shows a schematic diagram of a digit read and write circuit suitable for use in the memory of FIG. 1.

With reference now to FIG. 6, there is shown one form of writing and reading control circuit used successfully with the memory of FIG. 1. The circuit 108 is a balanced circuit, being symmetric about a center line, and it will be convenient to use the suffixes A and B to the reference numerals to designate corresponding elements of the two halves of the circuit.

In particular, the terminal associated with digit-line 105 is connected to the emitter of transistor 81A and the terminal associated with the second digit-line 106 to the emitter of transistor 81B. Additionally, terminals 105 and 106 are connected by way of resistors 82A and 82B, respectively, to terminal 83, which is maintained at a potential negative with respect to ground by a suitable D-C voltage supply (not shown). The base of transistor 81A is connected by way of a resistor 84A to terminal 85A, to which is applied a voltage if storage is to be made to an element associated with the digit-line 105. Similarly, the base of transistor 81B is connected by way of resistor 84B to terminal 85B for storage of a pulse in an element associated with the digit-line 106. The base of transistors 81A and 81B additionally are connected by way of resistors 86A and 86B, respectively, to ground point 87. The collectors of transistors 81A and 81B are connected by way of resistors 87A and 87B, respectively, to terminal 88 which is maintained at a positive voltage with respect to ground potential by means of a D-C voltage source (not shown). Capacitors 89A and 89B and resistors 90A and 90B are also connected between terminal 88 and the collectors of transistors 81A and 81B, respectively. The collectors of transistors 81A and 81B are connected by way of capacitors 89A and 89B to the collectors of transistors 91A and 91B and to the base of transistors 92A and 92B, respectively. The base of transistor 91A is connected to the collector of transistor 91B by way of resistor 93A, and the base of transistor 91B to the collector of transistor 91A by way of resistor 93B. Resistor 94 also interconnects the collectors of transistors 93A and 93B. The emitters of transistors 91A and 91B are shorted together and are connected to the collector of transistor 95, the emitter of which is connected to ground and the base of which is connected to terminal 96, to which are applied the gating control signals. The emitters of transistors 92A and 92B are shorted together and then connected by way of resistor 97 to terminal 98, which is maintained at a negative D-C voltage supply (not shown). Terminals 83 and 98 may be connected together to be supplied from the same voltage source. The collectors of transistors 92A and 92B are connected to output terminals 99A and 99B, respectively. Additionally, the collectors of transistors 92A and 92B are connected by way of resistors 121A and 121B to terminal 122, on which is maintained a voltage positive with respect to ground by way of a suitable D-C voltage supply (not shown). Terminals 122 and terminals 88 may be connected together to be maintained at the same voltage.

In operation, both transistors 81A and 81B are continually conducting and serve primarily to insure that the two digit lines see a constant low impedance. This insures that there will be relatively little interaction between different cells on the same digit lines. Additionally, for writing the base of the appropriate one of the two transistors has a pulse applied thereto via resistors 86A and 86B simultaneously with an application of writing signals to the appropriate word-select circuit, and as a consequence the voltage in the corresponding digit-line of the pair is increased or decreased whereby the selected storage cell is set appropriately.

The readout is controlled by readout pulses applied to the base of the gate 95 by way of terminal 96. In the absence of any readout pulse thereon, gate 95 is nonconducting and consequently each of transistors 91A and 91B, which together form a bistable flip-flop, is nonconducting. Moreover, in the absence of any pulse superposed on the steady current flowing in digit-lines 105 and 106, current flow to the output terminals is blocked by capacitors 89A and 89B, which together with their associated resistive network form a differentiating network responsive only to changes in the current flow through transistors 81A and 81B. During readout there will be an abrupt increase in the current flowing through one of terminals 105 and 106 corresponding to the digit and read out, and this current change will be transmitted through the corresponding one of capacitors 89A and 89B to the base of either transistor 91A or 91B. Since this will coincide with the application of a pulse to gate 95, the appropriate one of transistors 91A, 91B will conduct with a consequent change in the voltage on the appropriate one of output terminals 99A, 99B. Each of transistors 92A and 92B serves simply as a buffer to decouple transistors 91A and 91B from the load connected between terminals 99A and 99B.

It is to be understood that the various arrangements described are merely illustrative of the general principles of the invention. In particular, various modifications will be apparent to a worker in the art without departing from the spirit and scope of the invention for example, one of the two digit-lines of each pair can be kept at a fixed reference potential, for example ground, and information would be read in and read out simply by changes up or down in the potential on the other line. In such a case, the reference potential line can be provided simply by a common low resistivity layer in the semiconductor slice.

Additionally, for use as an associate memory, the complement of the word whose location is to be identified is applied to the digit line pairs and the desired word line is read by detecting the one whose voltage is unaffected by such application. Of course, the amplitudes of the complementing signals applied should be made sufficiently small so as not to disturb the states of the flip-flops.

What is claimed is:

1. A storage arrangement comprising a matrix of storage cells, each storage cell comprising a bistable circuit including a pair of semiconductive elements, means forming a first plurality of conduction paths, all the storage cells in a given row of the matrix being connected to a common path of said plurality, means forming a plurality of pairs of conduction paths, all the storage cells in a given column of the matrix being connected to a common pair of paths of said plurality, and circuit means connected to said pluralities of conduction paths for selectively controlling the states of the individual cells of the matrix in accordance with voltages applied thereto by way of the plurality of first conduction paths and the plurality of pairs of conduction paths, said circuit means including means in response to storing control information for first reducing the voltage on the first conduction paths of the storage cell in which there is to be stored information and for making nonconducting both of its pairs of semiconductive devices and for then increasing the voltage on said first conduction path while establishing a voltage difference across the pair of conduction paths associated with said storage cell so that a selected one of its pairs of semiconductive devices is made conducting, and said circuit means further including means in response to reading control information for changing the voltage on the first conduction path associated with the storage cell which is to be read sufficiently to cause a change in the current in one of the pair of conduction paths associated with the storage cell to be read and means for translating such current change into an output signal.

2. A storage arrangement as recited in claim 1 wherein the cells are free of any other electrical connections thereto.

3. A storage arrangement comprising a matrix of storage cells, each storage cell comprising a bistable circuit including a pair of transistors;

means forming a first plurality of conduction paths, all the storage cells in a given row of the matrix being coupled to a common path of said plurality in such manner that the collectors of the transistors are coupled electrically by way of separate load impedances to the common path;

means forming a plurality of pairs of conduction paths, all the storage cells in a given column of the matrix being coupled to a common pair of paths of said plurality in such manner that the emitters of the transistors are coupled electrically separately to one of the common pair of paths; and circuit means coupled to said pluralities of conduction paths for selectively controlling the states of the individual cells of the matrix in accordance with voltages applied thereto by way of the plurality of first conduction paths and the plurality of pairs of conduction paths;

said circuit means including means for providing all the operating power for the cells via the plurality of conduction paths coupled thereto.

4. A storage arrangement comprising a matrix of storage cells, each storage cell comprising a bistable circuit including a pair of field effect transistors;

means forming a first plurality of conduction paths, all the storage cells in a given row of the matrix being coupled to a common path of said plurality in such manner that the drains of the transistors are coupled electrically by way of separate load impedances to the common path;

means forming a plurality of pairs of conduction paths, all the storage cells in a given column of the matrix being coupled to a common pair of paths of said plurality in such manner that the sources of the transistors are coupled electrically separately to one of the common pair of paths; and circuit means coupled to said pluralities of conduction paths for selectively controlling the states of the individual cells of the matrix in accordance with voltages applied thereto by way of the plurality of first conduction paths and the plurality of pairs of conduction paths, said circuit means including means for providing all the operating power for the cells via the plurality of conduction paths coupled thereto.

5. Storage apparatus comprising:

a matrix of storage cells, each cell comprising a bistable circuit including a pair of semiconductive elements;

means forming a plurality of word line conduction paths, each cell in a given row of the matrix being connected to a common path of said plurality;

means forming a plurality of pairs of digit line conduction paths, each cell in a given column of the matrix being connected to a common pair of paths of said plurality;

said cells being free of any other connections thereto;

a plurality of word select circuits, one of which is connected to each word line conduction path, each of said plurality of word select circuits including means for providing the operating power for the cells connected thereto through the word line conduction path;

a plurality of reading and writing control circuits, one of which is connected to each pair of said digit line conduction paths;

said plurality of word select circuits and said plurality of reading and writing control circuits additionally including means for selectively controlling and sensing the state of said cells.

6. Storage apparatus as recited in claim 5 wherein a storage cell comprises:

a pair of junction transistors, each having emitter, base, and collector electrodes;

the collector electrodes of each being connected through separate load impedances to the word line conduction path;

the collector electrode of each being connected to the base electrode of the other;

the collector electrode of each being connected through a feedback impedance of the collector electrode of the other; and the emitter electrode of each being connected separately to the pair of digit line conduction paths.

References Cited

UNITED STATES PATENTS 3,218,613 11/1965 Gribble.
3,284,782 11/1966 Burns -------------- 340—173

3,295,031 12/1966 Schmitz.
3,354,440 11/1967 Farber.

OTHER REFERENCES

Gardner: Storage Cell, IBM Technical Disclosure Bulletin, vol. 9, No. 6, November 1966, p. 702.

TERRELL W. FEARS, Primary Examiner

U.S. Cl. X.R.

307—238, 279